US011897634B2

United States Patent
Radhakrishnan et al.

(10) Patent No.: US 11,897,634 B2
(45) Date of Patent: Feb. 13, 2024

(54) SYSTEMS AND METHODS FOR DETERMINING A STATE OF A STOWAGE BIN ASSEMBLY WITHIN AN INTERNAL CABIN OF A VEHICLE

(71) Applicant: THE BOEING COMPANY, Chicago, IL (US)

(72) Inventors: Venkatesh Babu Radhakrishnan, Karnataka (IN); Mugaludi Ramesha Rakesh, Karnataka (IN); Madhanmohan Savadamuthu, Karnataka (IN); Shubham Tripathi, Karnataka (IN); Ethan Carl Owyang, Bothell, WA (US)

(73) Assignee: THE BOEING COMPANY, Chicago, IL (US)

( * ) Notice: Subject to any disclaimer, the term of this patent is extended or adjusted under 35 U.S.C. 154(b) by 401 days.

(21) Appl. No.: 17/347,888

(22) Filed: Jun. 15, 2021

(65) Prior Publication Data
US 2022/0033108 A1 Feb. 3, 2022

Related U.S. Application Data

(60) Provisional application No. 63/057,943, filed on Jul. 29, 2020.

(51) Int. Cl.
*B64F 5/60* (2017.01)
*G06V 20/59* (2022.01)

(52) U.S. Cl.
CPC ............... *B64F 5/60* (2017.01); *G06V 20/59* (2022.01)

(58) Field of Classification Search
CPC ........... B64F 5/60; G06V 20/59; G06V 20/52; G06T 2207/10004; G06T 2207/20016; G06T 2207/20021; G06T 2207/20132; G06T 2207/30112; G06T 2207/30172; G06T 2207/30268; G06T 7/0008; G06T 5/006; G06T 7/11; G06T 7/536;
(Continued)

(56) References Cited

U.S. PATENT DOCUMENTS

| 8,955,802 B2 | 2/2015 | Diehl | |
| 2005/0172450 A1* | 8/2005 | Shiu | E05F 3/221 16/70 |

(Continued)

FOREIGN PATENT DOCUMENTS

| EP | 3335991 | 6/2018 | |
| KR | 101951683 B1 * | 2/2019 | G06K 9/00798 |

OTHER PUBLICATIONS

Extended European Search Report for EP 21180940.5-1010, dated Dec. 7, 2021.

*Primary Examiner* — Rodney A Butler
(74) *Attorney, Agent, or Firm* — Joseph M. Butscher; The Small Patent Law Group LLC (57) ABSTRACT

A system includes one or more components within an internal cabin of a vehicle. An imaging device is configured to obtain an image of the one or more components. A state determination control unit includes a processor. The state determination control unit is in communication with the imaging device. The state determination control unit receives image data including the image from the imaging device. Further, the state determination control unit determines a state of the one or more components based on the image data.

21 Claims, 7 Drawing Sheets

(58) Field of Classification Search
CPC ....... Y02T 50/40; B64D 11/003; B64D 45/00; B64D 2045/007; H04N 23/00
See application file for complete search history.

(56) References Cited

U.S. PATENT DOCUMENTS

| | | | |
|---|---|---|---|
| 2015/0241209 A1* | 8/2015 | Jouper | G01K 13/00 702/156 |
| 2017/0230620 A1 | 8/2017 | Watanabe | |
| 2017/0309001 A1 | 10/2017 | Zagaynov | |
| 2018/0173962 A1* | 6/2018 | Ibrahim | B64D 11/003 |
| 2018/0257554 A1* | 9/2018 | Simms | B60Q 3/30 |
| 2019/0233113 A1 | 8/2019 | Carswell | |
| 2019/0248383 A1* | 8/2019 | Maruta | B61B 1/02 |

\* cited by examiner

SYSTEMS AND METHODS FOR DETERMINING A STATE OF A STOWAGE BIN ASSEMBLY WITHIN AN INTERNAL CABIN OF A VEHICLE

CROSS-REFERENCE TO RELATED APPLICATION

This application is a non-provisional application of U.S. Patent Application No. 63/057,943, filed 29 Jul. 2020, and the entire disclosure of which is incorporated herein by reference.

FIELD OF THE DISCLOSURE

Embodiments of the subject disclosure generally relate to systems and methods for determining a state of a component, such as a stowage bin assembly, within an internal cabin of a vehicle.

BACKGROUND OF THE DISCLOSURE

Aircraft are used to transport passengers and cargo between various locations. An internal cabin of an aircraft includes numerous components that may be moved between open and closed states. For example, overhead stowage bin assemblies in an internal cabin include bins moveable between open and closed states. As another example, an exit door is moveable between an open and closed state. As another example, a door of a lavatory within an internal cabin is moveable between and open and closed state. As another example, a galley cart compartment may be in an open state, in which a galley cart can be moved into the compartment, and a closed state, in which a galley cart is already within the compartment. In general, an internal cabin of a vehicle of a commercial aircraft includes various components that are moveable between open and closed states.

During different stages of a flight, certain components are in a particular state. For example, during a boarding process, stowage bin assemblies are in an open state to allow for passengers to stow luggage and other personal items. As a departure time approaches, a flight attendant typically monitors the stowage bin assemblies and ensures that each is closed before the aircraft moves onto a taxiway and/or a runway. That is, an individual such as a flight attendant views and determines if any stowage bin assemblies are open. As can be appreciated, the process of walking through an internal cabin and visually determining which stowage bin assemblies are open and closed takes time. Further, in the event a flight attendant becomes distracted, such as if a passenger needs assistance, an open stowage bin assembly may be overlooked.

Some stowage bin assemblies include or otherwise coupled to sensors that are connected to a monitoring device through wiring. However, the sensors and wiring add weight to an aircraft. The sensors and wiring increase manufacturing complexity as the sensors and wiring need to be positioned and/or routed. Further, the additional weight from the sensors and wiring reduces fuel efficiency.

SUMMARY OF THE DISCLOSURE

A need exists for a system and a method for automatically determining a state of a component within an internal cabin of a vehicle. Further, a need exists for a system and a method for automatically determining whether stowage bin assemblies within an internal cabin of a vehicle are open or closed. Additionally, a need exists for a system and a method of monitoring a state of a component within an internal cabin that does not substantially add weight to a vehicle.

With those needs in mind, certain embodiments of the subject disclosure provide a system including one or more components within an internal cabin of a vehicle, an imaging device configured to obtain an image of the one or more components, and a state determination control unit comprising a processor. The state determination control unit is in communication with the imaging device. The state determination control unit receives image data including the image from the imaging device, and determines a state of the one or more components based on the image data.

In at least one embodiment, the state includes one or both of an open state or a closed state. In at least one embodiment, the one or more components are one or more overhead stowage bin assemblies.

In at least one embodiment, the state determination control unit determines a region of interest within the image data. For example, the state determination control unit determines the region of interest by determining a vanishing point within the image. As a further example, the state determination control unit determines a bisecting line that passes through the vanishing point. The region of interest is determined by the bisecting line.

In at least one embodiment, the state determination control unit corrects for perspective within the image data. For example, the one or more components include a plurality of components in a row. The state determination control unit generates a first end line at a first end of the row and a second end line at a second end of the row opposite from the first end line. The state determination control unit further generates an upper boundary line associated with an upper edge of the row, and a lower boundary line associated with a lower edge of the row. The first end line and the upper boundary line intersect at a first corner. The first end line and the lower boundary line intersect at a second corner. The second end line and the upper boundary line intersect at a third corner. The second end line and the lower boundary line intersect at a fourth corner. The first corner, the second corner, the third corner, and the fourth corner are corners of a quadrilateral that bounds the plurality of components. The state determination control unit geometrically transforms the quadrilateral into a rectangle having respective corresponding corners to form a perspective corrected image.

In at least one embodiment, the state determination control unit extrapolates a shape of each of the one or more components within the image data.

In at least one embodiment, the state determination control unit determines the state of the one or more components through clustering.

In at least one embodiment, the state determination control unit determines the state of the one or more components by determining a difference in image attributes.

In at least one example, the system further includes a user device. The state determination control unit outputs a state signal indicative of the state of the one or more components to the user device.

In at least one example, the state determination control unit outputs a component control signal that automatically operates the one or more components based on state of the one or more components.

Certain embodiments of the subject disclosure provide a method including obtaining, by an imaging device, an image of one or more components within an internal cabin of a vehicle, receiving, by a state determination control unit comprising a processor that is in communication with the imaging device, image data including the image from the imaging device, and determining, by the state determination control unit, a state of the one or more components based on the image data.

Certain embodiments of the subject disclosure provide a non-transitory computer-readable storage medium comprising executable instructions that, in response to execution, cause a system comprising a processor, to perform operations including receiving image data including an image of one or more components within an internal cabin of a vehicle from an imaging device within the internal cabin, and determining a state of the one or more components based on the image data.

DETAILED DESCRIPTION OF THE DISCLOSURE

The foregoing summary, as well as the following detailed description of certain embodiments will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "including," "comprising," or "having" an element or a plurality of elements having a particular condition can include additional elements not having that condition.

Certain embodiments of the subject disclosure provide a system and a method for determining a state (such as an open state and a closed state) of a component (such as a stowage bin assembly) within an internal cabin of a vehicle (such as an aircraft). The system and method are configured to detect a state of a component using in-cabin video cameras in real-time to automatically log these events, trigger further procedures and alert flight crew with event information.

Certain embodiments of the subject disclosure provide a system and a method for automatically detecting cabin events using video feed available from on-board cameras to automatically log, trigger future events and alert crew about event information. By processing the events in multiple flights, the system and method are able to detect potential events which are abnormal.

In at least one embodiment, the system and method include viewing an in-cabin camera input, determining regions of interest, calculating a vanishing point, applying an algorithm to correct perspective, extrapolating bin location, clustering components to identify a state, and alerting crew of status. By analyzing image data obtained from one or more imaging devices to detect a state of a component, embodiments of the subject disclosure are configured to operate without the use of sensors and wiring, thereby reducing manufacturing cost and complexity, as well as increasing fuel efficiency.

Figure 1:
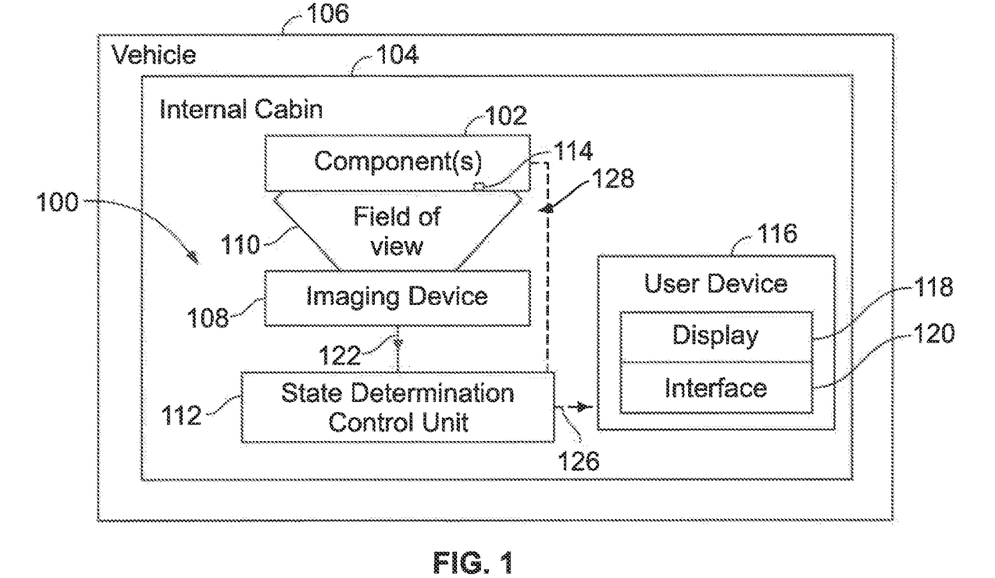
FIG. 1 illustrates a schematic block diagram of a system for determining a state of one or more components within an internal cabin of a vehicle, according to an embodiment of the subject disclosure.

FIG. 1 illustrates a schematic block diagram of a system 100 for determining a state of one or more components 102 within an internal cabin 104 of a vehicle 106, according to an embodiment of the subject disclosure. In at least one embodiment, the component(s) 102 are overhead stowage bin assemblies that are configured to be moved between an open state and a closed state. As another example, the component(s) 102 are one or more doors within the internal cabin 104, such as lavatory doors or exit doors. As another example, the components 102 are compartments, such galley cart components, within the internal cabin 104.

In at least one embodiment, the vehicle 106 is an aircraft. As another example, the vehicle 106 is a land-based vehicle, such as a bus, passenger train car, or the like. As another example, the vehicle 106 is a watercraft or a spacecraft The system 100 includes an imaging device 108 within the internal cabin 104. The imaging device 108 has a field of view 110. The component(s) 102 are within the field of view 110. In at least one embodiment, the imaging device 108 is a video camera. As another example, the imaging device 108 is a night vision camera. As another example, the imaging device 108 is an infrared camera.

The imaging device 108 can be a fixed camera within the internal cabin 104. For example, the imaging device 108 can be secured to a ceiling, wall, monument, or the like within the internal cabin 104. As another example, the imaging device 108 can be a mobile camera, such as a handheld camera, such as part of a smart phone or smart tablet.

The system 100 further includes a state determination control unit 112 in communication with the imaging device 108. For example, the state determination control unit 112 wirelessly communicates with the imaging device 108, such as through a Bluetooth, Wifi, or other such connection. Alternatively, the state determination control unit 112 can be in communication with the imaging device 108 through a wired connection.

In at least one embodiment, the component(s) 102 can include an actuator 114, such as an electric motor, that is configured to automatically move the component(s) 102 between an open state and a closed state. Further, the state determination control unit 112 wirelessly communicates with the actuator 114, in order to control opening and closing of the component(s) 102. Optionally, the state determination control unit 112 communicates with the actuator 114 through a wired connection. Also, optionally, the state determination control unit 112 is not in communication with the actuator 114. Also, optionally, the component 102 may not include the actuator 114.

In at least one embodiment, a user device 116 is also within the internal cabin 104. The user device 116 includes a display 118 coupled to an interface 120. For example, the user device 116 is a computer workstation within the internal cabin 104. As another example, the user device 116 is a handheld device, such as a smart phone or smart tablet. The display 118 can be a monitor or screen. The interface 120 can include a keyboard, mouse, and/or the like. In at least one embodiment, the display 118 and the interface 120 are integrated together into a touchscreen interface. The state determination control unit 112 is in communication with the user device 116, such as through a wired or wireless connection.

As described herein, the system 100 includes one or more components 102 within the internal cabin 104 of the vehicle 106. The imaging device 108 is configured to obtain an image of the one or more components 102. The state determination control unit 112 is in communication with the imaging device 108. The state determination control unit 112 receives the image data 122 including the image from the imaging device 108. The state determination control unit 112 determines a state (such as an open state or a closed state) of the one or more components 102 based on the image data 122.

In operation, the imaging device 108 obtains an image of the component(s) 102. The image may be a video image or a still photograph image. The imaging device 108 obtains the image of the component(s) 102 as image data 122. The state determination control unit 112 receives the image data 122 that includes the image of the component(s) 102 from the imaging device 108.

The state determination control unit 112 analyzes the image data 122 to determine a state of the component(s) 102. For example, the state determination control unit 112 analyzes the image data 122 to determine if the component(s) 102 (such as an overhead stowage bin assembly) is in an open state (that is, opened) or a closed state (that is, closed).

In at least one embodiment, the state determination control unit 112 analyzes the image data 122 by determining a region of interest within the image data 122. For example, in at least one embodiment, the region of interest includes a row of components 102, such as a row of overhead stowage bin assemblies within the internal cabin 104.

After determining the region of interest, the state determination control unit 112 perspective corrects the image data 122 to provide a perspective corrected image of the image data 122. For example, the state determination control unit 112 corrects for the perspective of an image of three dimensional space. Alternatively, the state determination control unit 112 may not perspective correct the image data 122.

Next, the state determination control unit 112 extrapolates individual components 102 within the perspective corrected image. For example, during an initial calibration or set up, the state determination control unit 112 is programmed to recognize a size and shape of each individual component 102 within the image data 122 (such as within the perspective corrected image). In at least one embodiment, the state determination control unit 112 extrapolates a shape of each of the components 102 within the image data 122.

The state determination control unit 112 then determines a state of the components 102 through clustering, such as by determining a difference in image attributes (for example, differences in color, color intensity, brightness, and/or the like). For example, the components 102 within the perspective corrected image are clustered based on differences in color therebetween. If there is a single cluster in relation to the components 102 within the perspective corrected image, then the state determination control unit 112 determines that all of the components 102 are in the same state, such as an open state or a closed state. In at least one embodiment, the state determination control unit 112 is calibrated to determine an image attribute for a closed state. For example, an image of a component 102 having a first color is determined to be in a closed state. As such, if a single cluster of components 102 all sharing the same attribute, such as the same color or color intensity, correlated to a close state, then the state determination control unit 112 determines that all of the components 102 are closed. If, however, the single cluster of components 102 differs from the predetermined image attribute of a closed state, then the state determination control unit 112 determines that the components 102 are in an open state.

Further, the image data 122 may show that there are different clusters of images. For example, a first cluster corresponding to a first set of one or more components 102 has a first image attribute (such as a first color or intensity), and a second cluster corresponding to a second set of one or more components 102 has a second image attribute that differs from the first image attribute. Accordingly, the state determination control unit 112 determines that one of the first set or the second set is in an open state, while the other is in a closed state. The state determination control unit 112 determines which set is in a closed state or an open state based on a predetermined image attribute. For example, the state determination control unit 112 can be calibrated to recognize a first image attribute as the closed state, and a second image attribute differing from the first image attribute is therefore in the open state, or vice versa.

The state determination control unit 112 associates the first cluster and the second cluster with locations of the components 102 within the internal cabin 104. For example, the state determination control unit 112 is calibrated to locate and label each of the components 102 within the internal cabin 102, such as via an initial manual calibration or setup. Accordingly, based on image analysis, the state determination control unit 112 detects the state (such as open or closed) of the components 102 within the internal cabin 104.

In at least one embodiment, the state determination control unit 112 detects the state of the components 102 through clustering, as described herein. The state determination control unit 112 compares clusters within the image data 122 to differentiate between open and closed states. In such an embodiment, the state determination control unit 112 does not compare the image data 122 against historic image data regarding open and closed states. As such, the system 100 can operate using less memory (which would otherwise store the historic data), and less computing power, thereby providing for efficient operation.

The state determination control unit 112 then outputs a state signal 126 to the user device 116. The state signal 126 is indicative of the state of the component(s) 102. The state signal 126 includes state data for the components 102 within the internal cabin 104. For example, the state signal 126 indicates which of the components 102 are open and closed. The state signal 126 is received by the user device 116, which may provide video or graphic data on the display 118, an audio signal, or the like to alert an attendant as to which of the components 102 are open and closed. In this manner, the state determination control unit 112 automatically detects a state of the components 102, and alerts an attendant, who is then able to close or open the components 102 as desired.

In at least one embodiment, the state determination control unit 112 can automatically operate the components 102, such as through the actuators 114, based on the determined states of the components 102. For example, after the state determination control unit 112 analyzes the image data 122 to determine which of the components 102 are open and closed, the state determination control unit 112 outputs a component control signal 128 to the actuators 114 to selectively close open components 102 or open closed components 102, as desired. Thus, based on a determination of a state of a component 102, the state determination control unit 112 may automatically operate the component 102, such as via the actuator 114, to selectively move the component 102 between an open state and a closed state. Alternatively, the state determination control unit 112 is not configured to automatically operate the component(s) 102.

Alternatively, the state determination control unit 112 can include or otherwise be coupled to a memory that stores image data regarding components 102 in open and closed states (and optionally full, partially full, empty, latched, and unlatched states). In this embodiment, the state determination control unit 112 compares the image data 122 in relation to the stored image data to determine whether the component(s) 102 are in open or closed states.

Figure 2:
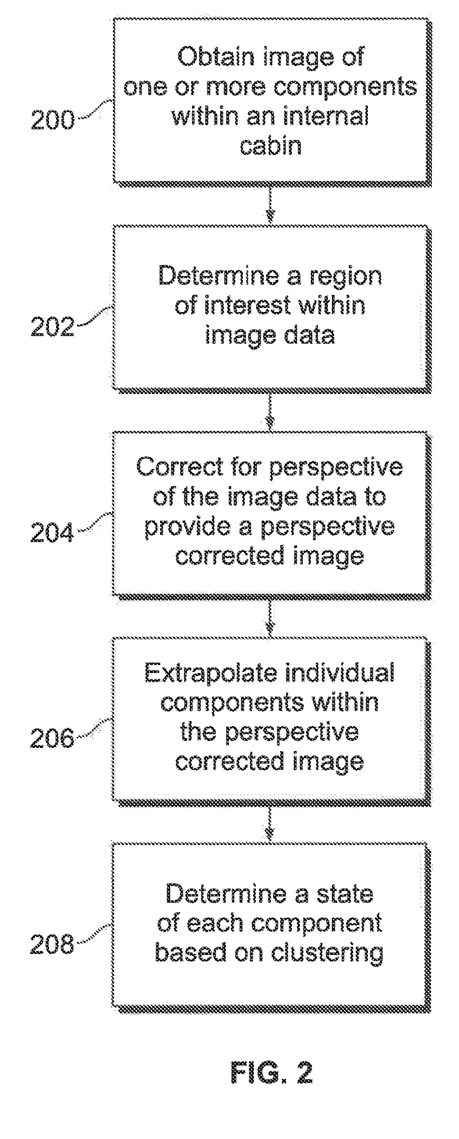
FIG. 2 illustrates a flow chart of a method for determining a state of one or more components within an internal cabin of a vehicle, according to an embodiment of the subject disclosure.

FIG. 2 illustrates a flow chart of a method for determining a state of one or more components within an internal cabin of a vehicle, according to an embodiment of the subject disclosure. Referring to FIGS. 1 and 2, at 200, the imaging device 108 obtains an image of one or more components 102 within the internal cabin 104. At 202, the state determination control unit 112 determines a region of interest within the image data 122 that includes the image. At 204, the state determination control unit 112 corrects for perspective of the image data 122 to provide a perspective corrected image. At 206, the state determination control unit 112 extrapolates the individual components 102 within the perspective corrected image. At 208, the state determination control unit 112 determines a state of each component 102 based on clustering.

Figure 3:
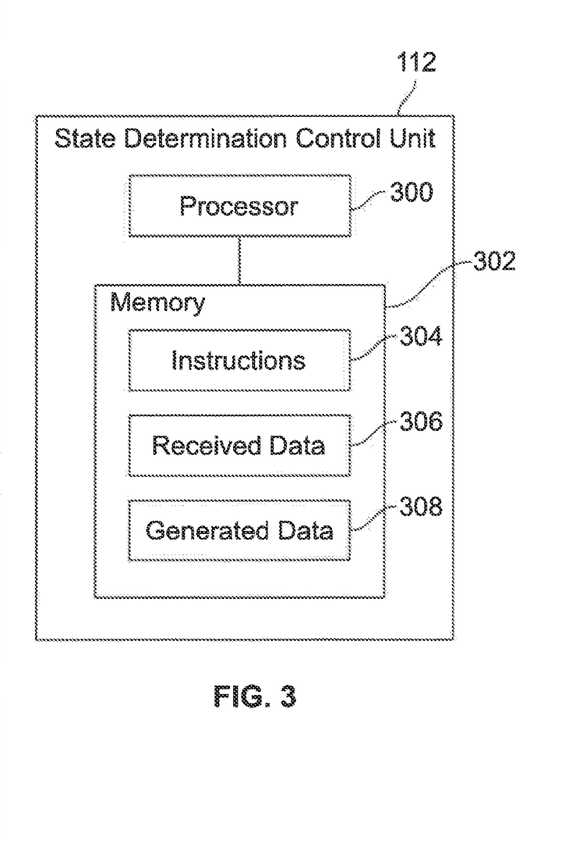
FIG. 3 illustrates a schematic block diagram of a state determination control unit, according to an embodiment of the subject disclosure.

FIG. 3 illustrates a schematic block diagram of the state determination control unit 112, according to an embodiment of the subject disclosure. In at least one embodiment, the state determination control unit 112 includes at least one processor 300 in communication with a memory 302. The memory 302 stores instructions 304, received data 306, and generated data 308. The state determination control unit 112 shown in FIG. 3 is merely exemplary, and non-limiting.

As used herein, the term "control unit," "central processing unit," "unit," "CPU," "computer," or the like can include any processor-based or microprocessor-based system including systems using microcontrollers, reduced instruction set computers (RISC), application specific integrated circuits (ASICs), logic circuits, and any other circuit or processor including hardware, software, or a combination thereof capable of executing the functions described herein. Such are exemplary only, and are thus not intended to limit in any way the definition and/or meaning of such terms. For example, the state determination control unit 112 can be or include one or more processors that are configured to control operation thereof, as described herein.

The state determination control unit 112 is configured to execute a set of instructions that are stored in one or more data storage units or elements (such as one or more memories), in order to process data. For example, the state determination control unit 112 can include or be coupled to one or more memories. The data storage units can also store data or other information as desired or needed. The data storage units can be in the form of an information source or a physical memory element within a processing machine. The one or more data storage units or elements can comprise volatile memory or nonvolatile memory, or can include both volatile and nonvolatile memory. As an example, the nonvolatile memory can comprise read only memory (ROM), programmable ROM (PROM), electrically programmable ROM (EPROM), electrically erasable PROM (EEPROM), and/or flash memory and volatile memory can include random access memory (RAM), which can act as external cache memory. The data stores of the disclosed systems and methods is intended to comprise, without being limited to, these and any other suitable types of memory.

The set of instructions can include various commands that instruct the state determination control unit 112 as a processing machine to perform specific operations such as the methods and processes of the various embodiments of the subject matter described herein. The set of instructions can be in the form of a software program. The software can be in various forms such as system software or application software. Further, the software can be in the form of a collection of separate programs, a program subset within a larger program or a portion of a program. The software can also include modular programming in the form of object-oriented programming. The processing of input data by the processing machine can be in response to user commands, or in response to results of previous processing, or in response to a request made by another processing machine.

The diagrams of embodiments herein can illustrate one or more control or processing units, such as the state determination control unit 112. It is to be understood that the processing or control units can represent circuits, circuitry, or portions thereof that can be implemented as hardware with associated instructions (e.g., software stored on a tangible and non-transitory computer readable storage medium, such as a computer hard drive, ROM, RAM, or the like) that perform the operations described herein. The hardware can include state machine circuitry hardwired to perform the functions described herein. Optionally, the hardware can include electronic circuits that include and/or are connected to one or more logic-based devices, such as microprocessors, processors, controllers, or the like. Optionally, the state determination control unit 112 can represent processing circuitry such as one or more of a field programmable gate array (FPGA), application specific integrated circuit (ASIC), microprocessor(s), and/or the like. The circuits in various embodiments can be configured to execute one or more algorithms to perform functions described herein. The one or more algorithms can include aspects of embodiments disclosed herein, whether or not expressly identified in a flowchart or a method.

As used herein, the terms "software" and "firmware" are interchangeable, and include any computer program stored in a data storage unit (for example, one or more memories) for execution by a computer, including RAM memory, ROM memory, EPROM memory, EEPROM memory, and non-volatile RAM (NVRAM) memory. The above data storage unit types are exemplary only, and are thus not limiting as to the types of memory usable for storage of a computer program.

Figure 4:
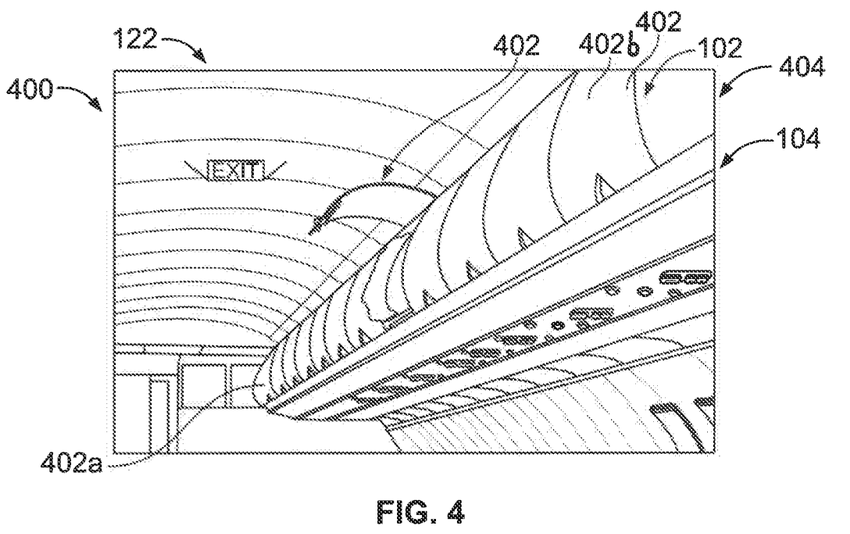
FIG. 4 illustrates an image of a portion of an internal cabin, according to an embodiment of the subject disclosure.

FIG. 4 illustrates an image 400 of a portion of the internal cabin 104, according to an embodiment of the subject disclosure. Referring to FIGS. 1 and 4, the image 400 is or is otherwise part of the image data 122 obtained by the imaging device 108. The image 400 shows a plurality of components 102. As shown, the components 102 are overhead stowage bin assembly 402 arranged in a row 404. The image 400 is of a three-dimensional space within the internal cabin 104. Accordingly, the image 400 provides perspective, such that a first overhead stowage bin assembly 402a that is further away appears smaller than a second overhead stowage bin assembly 402b that is closer.

Figure 5:
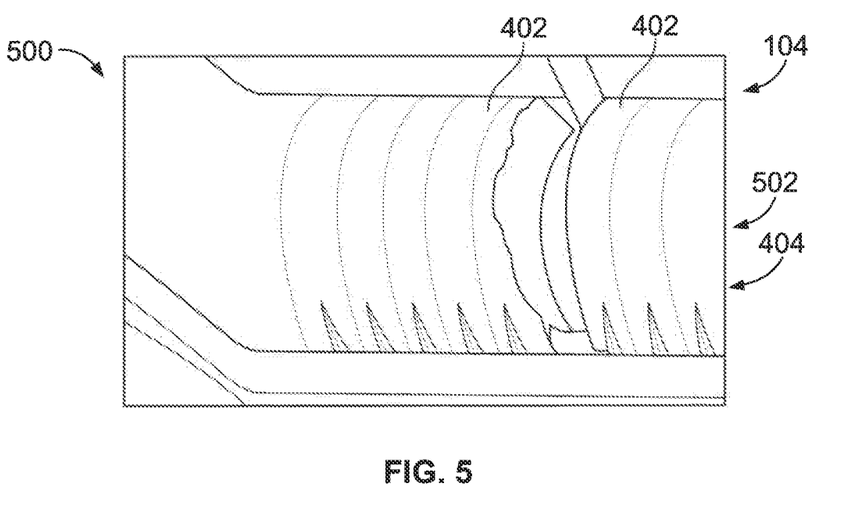
FIG. 5 illustrates a perspective corrected image of a region of interest including a row of overhead stowage bin assemblies within the internal cabin, according to an embodiment of the subject disclosure.

FIG. 5 illustrates a perspective corrected image 500 of a region of interest 502 including the row 404 of overhead stowage bin assemblies 402 within the internal cabin 104, according to an embodiment of the subject disclosure. Referring to FIGS. 1, 4, and 5, after determining the region of interest 502 from the image 400, the state determination control unit 112 provides the perspective corrected image 500 so that each of the overhead stowage bin assemblies 402 are of similar shape and size within the perspective corrected image 500.

Figure 6:
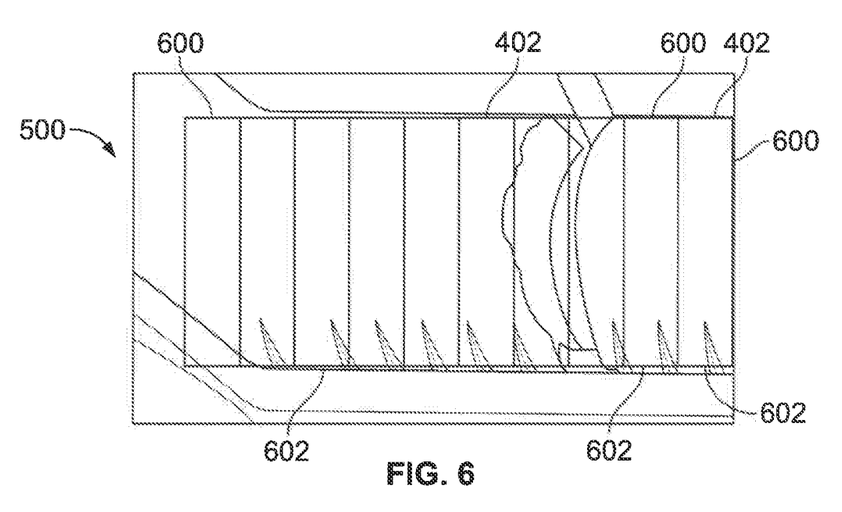
FIG. 6 illustrates the perspective corrected image having extrapolated bin shapes that correspond to the overhead stowage bin assemblies, according to an embodiment of the subject disclosure.

FIG. 6 illustrates the perspective corrected image 500 having extrapolated bin shapes 600 that correspond to the overhead stowage bin assemblies 402, according to an embodiment of the subject disclosure. For example, during a calibration, a rectangle 602 that corresponds to a two dimensional front of an overhead stowage bin assembly 402 is overlaid on a corresponding overhead stowage bin assembly 402. An adjacent rectangle 602 is then placed next to the initial rectangle 602, and so on, in order to associate each overhead stowage bin assembly 402 within an associated bin shape 600. In this manner, each overhead stowage bin assembly 402 corresponds to an associated bin shape 600. Each bin shape 600 is then associated with a particular overhead stowage bin assembly 402 location. Thus, each bin shape 600 can be labeled with a location of a specification overhead stowage bin assembly 402.

Figure 7:
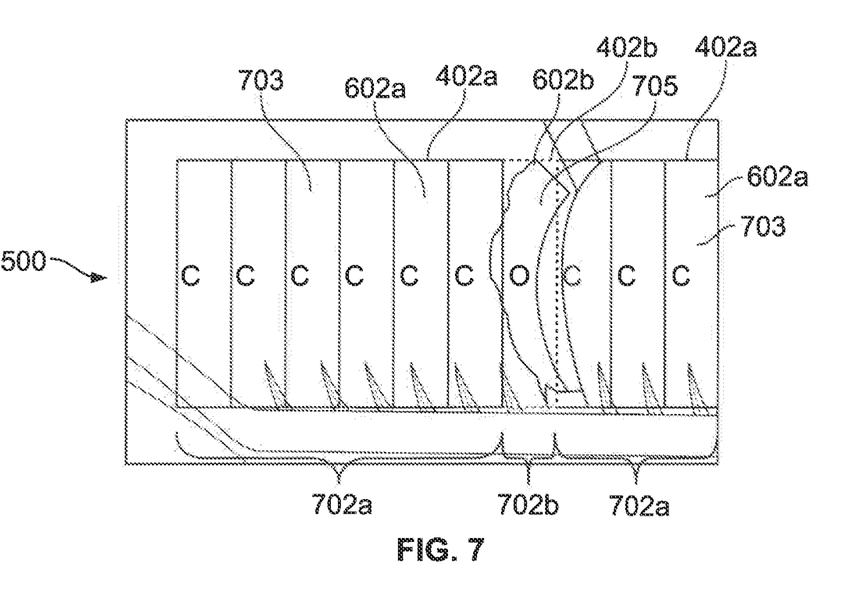
FIG. 7 illustrates the perspective corrected image having a first cluster of bin shapes corresponding to a first group of overhead stowage bin assemblies and a second cluster of bin shapes corresponding to a second group of overhead stowage bin assemblies, according to an embodiment of the subject disclosure.

FIG. 7 illustrates the perspective corrected image 500 having a first cluster 702a of bin shapes 602a corresponding to a first group of overhead stowage bin assemblies 402a and a second cluster 702b of bin shapes 602b corresponding to a second group of overhead stowage bin assemblies 402b, according to an embodiment of the subject disclosure. The first group and the second group of overhead stowage bin assemblies 402a and 402b can each include one or more overhead stowage bin assemblies 402a and 402b.

Referring to FIGS. 1 and 7, the state determination control unit 112 differentiates between the first cluster 702a and the second cluster 702b through one or more differences in image attributes. As an example, the first cluster 702a has a first image attribute 703, such as a first color or color intensity, and the second cluster 702b has a second image attribute 705, such as a second color or color intensity, which differs from the first color or color intensity. The state determination control unit 112 detects the difference between the first image attribute 703 and the second image attribute 705 and therefore determines that the first group of overhead stowage bin assemblies 402a is in a different state than the second group of overhead stowage bin assemblies 402b. In at least one embodiment, the state determination control unit 112 is programmed to associate the second image attribute 705 with an open state. As such, the state determination control unit 112 determines that the first group of overhead stowage bin assemblies 402a are in a closed state, while the second group of overhead stowage bin assemblies 402b are in an open state. The state determination control unit 126 can then output the state signal 126 indicating the states of the associated overhead stowage bin assemblies 402a and 402b to the user device 116. Further, the state determination control unit 126 can output the component control signal 128 to an actuator 114 of the overhead stowage bin assembl(ies) 402b to automatically close the overhead stowage bin assembl(ies) 402b.

Figure 8:
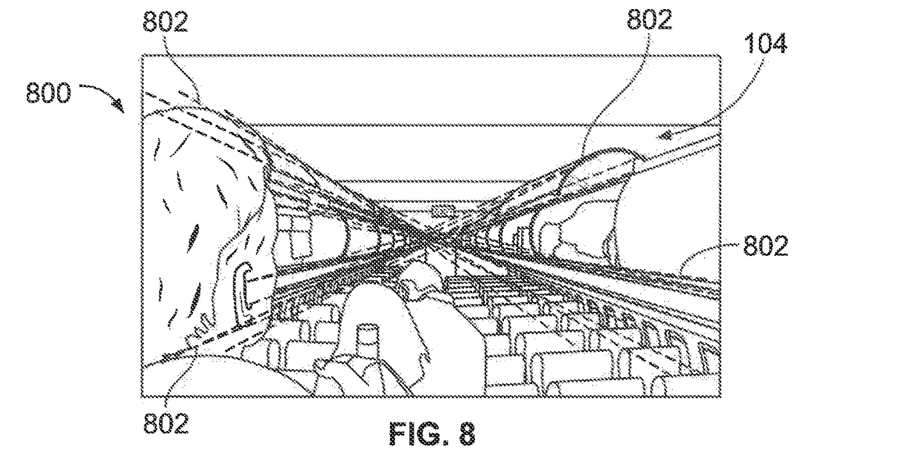
FIG. 8 illustrates an image of a portion of the internal cabin, according to an embodiment of the subject disclosure.

FIG. 8 illustrates an image 800 of a portion of the internal cabin 104, according to an embodiment of the subject disclosure. Referring to FIGS. 1 and 8, in at least one embodiment, in order to determine a region of interest, the state determination control unit 112 analyzes the image 800 to determine a plurality of edges 802 of various features within the image 800. The edges 802 are extended toward a vanishing point of the image 800.

Figure 9:
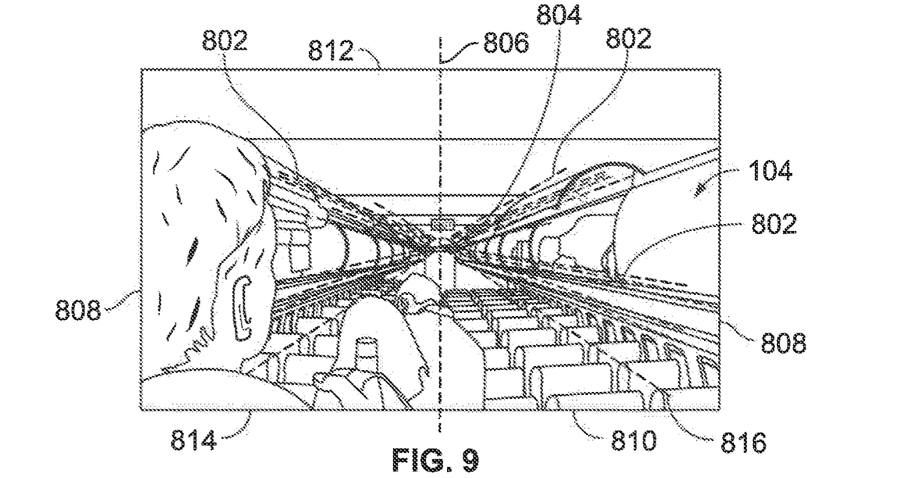
FIG. 9 illustrates a vanishing point within the image of the portion of the internal cabin of FIG. 8, according to an embodiment of the subject disclosure.

FIG. 9 illustrates the vanishing point 804 within the image 800 of the portion of the internal cabin 104 of FIG. 8, according to an embodiment of the subject disclosure. The edges 802 converge toward and intersect at the vanishing point 804. Referring to FIGS. 1 and 9, the state determination control unit 112 determines the vanishing point 804 at the intersection of the edges 802.

The state determination control unit 112 then determines a bisecting line 806 that passes through the vanishing point 804. The bisecting line 806 is parallel to side edges 808 of the image 800, and perpendicular to a bottom edge 810 and a top edge 812 of the image 800. The bisecting line 806 bisects the image 800 into a first half 814 and a second half 816, each of which is associated with a separate region of interest. Thus, the regions of interest are determined by the bisecting line 806.

Figure 10:
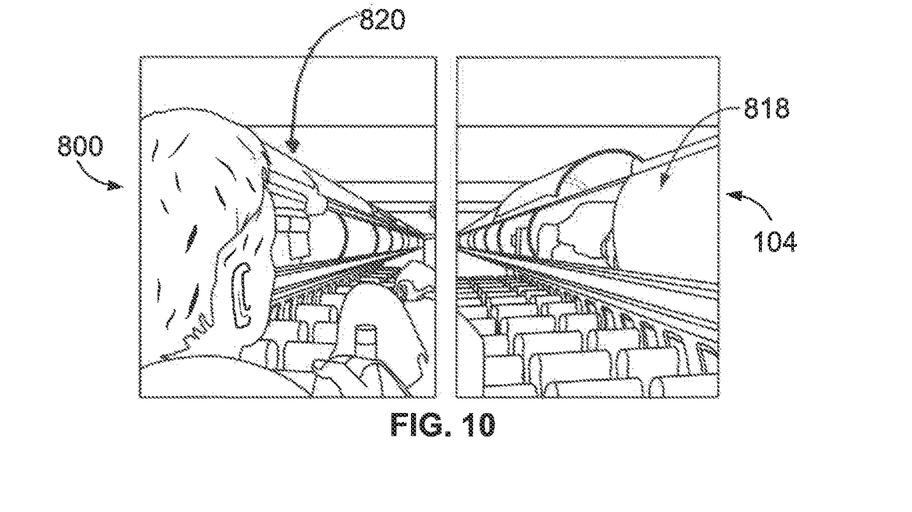
FIG. 10 illustrates a first region of interest and a second region of interest of the image of the portion of the internal cabin of FIG. 8, according to an embodiment of the subject disclosure.

FIG. 10 illustrates a first region of interest 818 and a second region of interest 820 of the image 800 of the portion of the internal cabin 104 of FIG. 8, according to an embodiment of the subject disclosure. Referring to FIGS. 1, 9, and 10, the state determination control unit 112 separates the first region of interest 818 from the second region of interest 820 through the bisecting line 806 that passes through the vanishing point 804.

Figure 11:
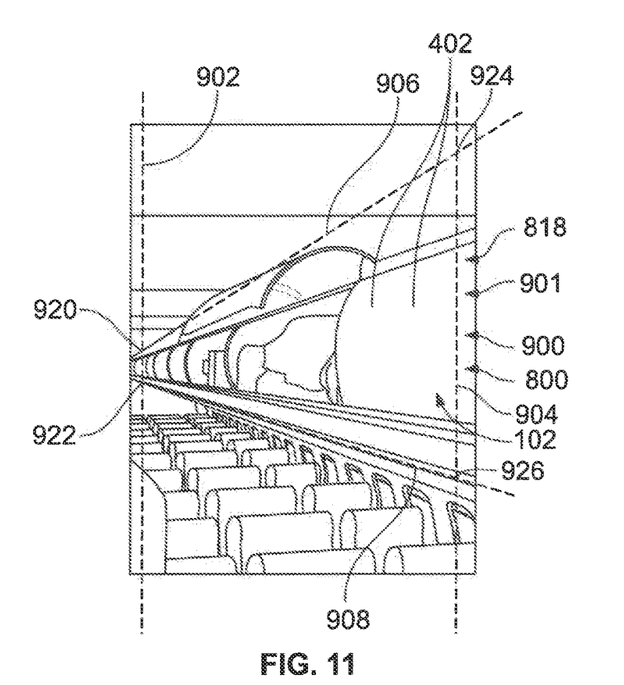
FIG. 11 illustrates a first region of interest of the image, according to an embodiment of the subject disclosure.

FIG. 11 illustrates the region of interest 818 of the image 800, according to an embodiment of the subject disclosure. Referring to FIGS. 1 and 11, the state determination control unit 112 determines the region of interest 818 to analyze, such as via calibration, user input, and/or the like. The region of interest 818 includes a row 901 of components 102, such as the overhead stowage bin assemblies 402.

The state determination control unit 112 generates a first end line 902 at one end of the row 901. For example, the first end line 902 can be a formed at a predetermined distance from the vanishing point 804 (shown in FIG. 9). The state determination control unit 112 generates a second end line 904 opposite from the first end line 902. The second end line 904 can be at an opposite end of the row 901. The state determination control unit 112 generates an upper boundary line 906 associated with an upper edge of the row 901, and a lower boundary line 908 associated with a lower edge of the row 902. The first end line 902 and the upper boundary line 906 intersect at a first corner 920. The first end line 902 and the lower boundary line 908 intersect at a second corner 922. The second end line 904 and the upper boundary line 906 intersect at a third corner 924. The second end line 904 and the lower boundary line 908 intersect at a fourth corner 926. The first corner 920, the second corner 922, the third corner 924, and the fourth corner 926 are corners of a quadrilateral, such as a trapezium, which bounds the overhead stowage bin assemblies 402 of the row 901.

Figure 12:
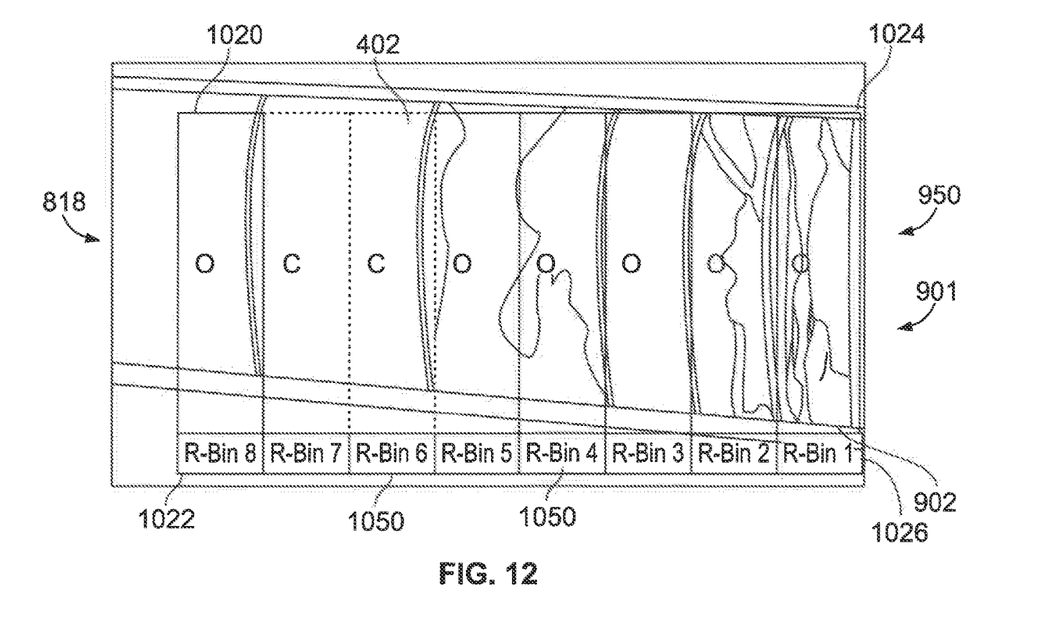
FIG. 12 illustrates a perspective corrected image of a row of overhead stowage bin assemblies within the first region of interest of FIG. 11, according to an embodiment of the subject disclosure.

FIG. 12 illustrates a perspective corrected image 950 of the row 901 of overhead stowage bin assemblies 402 within the first region of interest 818 of FIG. 11, according to an embodiment of the subject disclosure. Referring to FIGS. 1, 11, and 12, the state determination control unit 112 geometrically transforms the quadrilateral defined by the corners 920, 922, 924, and 926 into a rectangle having respective corresponding corners 1020, 1022, 1024, and 1026 to form the perspective corrected image 950. The perspective corrected image 950 includes the overhead stowage bin assemblies 402 of the row 901, each of which has the same or substantially the same shape. The state determination control unit 112 then extrapolates the bin shapes and associated labels for each overhead stowage bin assembly 402, such as described with respect to FIG. 6, for example.

The uniform size of each bin shape of the associated overhead stowage bin assemblies decreases complexity of analysis, and therefore reduces computing power. In this manner, the state determination control unit 112 operates with increased efficiency. In general, the uniform size of the bin shapes enables improved feature extraction for bin status determination.

Embodiments of the subject disclosure provide systems and methods that allow large amounts of data to be quickly and efficiently analyzed by a computing device. For example, an internal cabin of a vehicle can include numerous components that are movable between open and closed states, and which can be overlooked by attendants and other individuals within the internal cabin. As such, large amounts of data are being tracked and analyzed by the state determination control unit 112. The vast amounts of data are efficiently organized and/or analyzed by the state determination control unit 112, as described above. The state determination control unit 112 analyzes the data in a relatively short time in order to quickly and efficiently output information as to which particular components are opened or closed. A human being would be incapable of efficiently analyzing such amounts of data in such a short time. As such, embodiments of the subject disclosure provide increased and efficient functionality, and vastly superior performance in relation to a human being analyzing the data.

In at least one embodiment, components of the system 100, such as the state determination control unit 112, provide and/or enable a computer system to operate as a special computer system for detecting states of components within an internal cabin.

Figure 13:
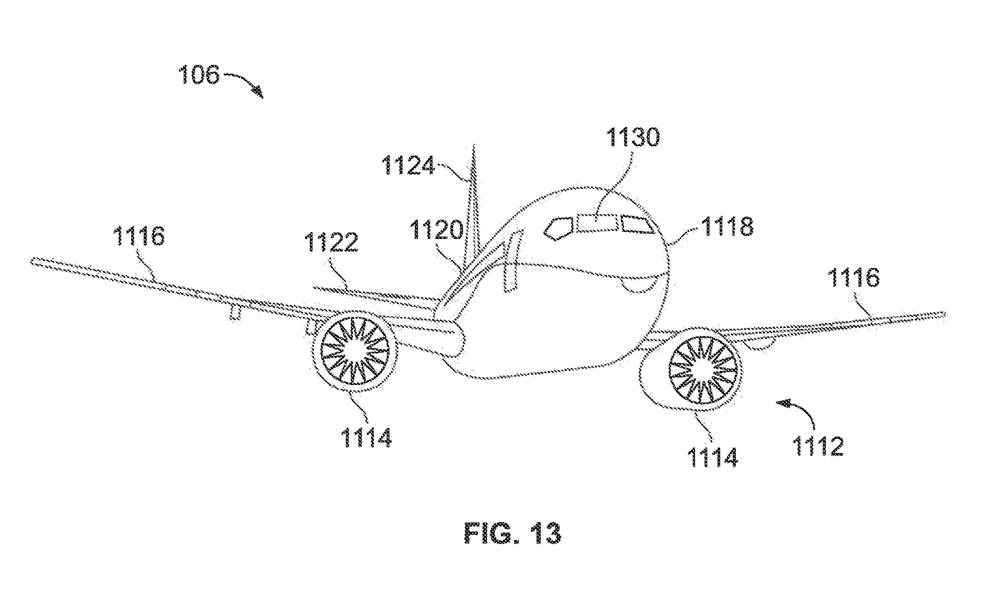
FIG. 13 illustrates a front perspective view of a vehicle, according to an exemplary embodiment of the subject disclosure.

FIG. 13 illustrates a front perspective view of the vehicle 106, according to an exemplary embodiment of the subject disclosure. In at least one embodiment, the vehicle 106 is an aircraft. The aircraft 106 includes a propulsion system 1112 that can include two engines 1114, for example. Optionally, the propulsion system 1112 can include more engines 1114 than shown. The engines 1114 are carried by wings 1116 of the aircraft 106. In other embodiments, the engines 1114 can be carried by a fuselage 1118 and/or an empennage 1120.

The empennage 1120 can also support horizontal stabilizers 1122 and a vertical stabilizer 1124. The fuselage 1118 of the aircraft 106 defines an internal cabin, which can include a cockpit 1130, one or more work sections (for example, galleys, personnel carry-on baggage areas, and the like), and/or one or more passenger sections.

Optionally, instead of an aircraft, embodiments of the subject disclosure may be used with various other vehicles, such as automobiles, buses, locomotives and train cars, watercraft, and the like. Further, embodiments of the subject disclosure may be used with respect to fixed structures, such as commercial and residential buildings.

Referring to FIGS. 1-13, embodiments of the subject disclosure provide systems and methods for automatically determining a state of a component within an internal cabin of a vehicle. Further, embodiments of the subject disclosure provide systems and methods for automatically determining whether stowage bin assemblies within an internal cabin of a vehicle are open or closed. Additionally, the systems and methods operate through image analysis, and can be devoid of separate sensors and wiring. As such, embodiments of the subject disclosure provide systems and methods that reduce manufacturing complexity and costs, reduce overall weight of a vehicle, and increase fuel efficiency of the vehicle.

Further, the disclosure comprises embodiments according to the following clauses:

Clause 1. A system comprising:
one or more components within an internal cabin of a vehicle;
an imaging device configured to obtain an image of the one or more components; and
a state determination control unit comprising a processor, wherein the state determination control unit is in communication with the imaging device,
wherein the state determination control unit receives image data including the image from the imaging device, and
wherein the state determination control unit determines a state of the one or more components based on the image data.

Clause 2. The system of Clause 1, wherein the state comprises one or both of an open state or a closed state.

Clause 3. The system of Clauses 1 or 2, wherein the one or more components are one or more overhead stowage bin assemblies.

Clause 4. The system of any of Clauses 1-3, wherein the state determination control unit determines a region of interest within the image data.

Clause 5. The system of any of Clauses 1-4, wherein the state determination control unit determines the region of interest by determining a vanishing point within the image.

Clause 6. The system of any of Clauses 1-5, wherein the state determination control unit determines a bisecting line that passes through the vanishing point, wherein the region of interest is determined by the bisecting line.

Clause 7. The system of any of Clauses 1-6 wherein the state determination control unit corrects for perspective within the image data.

Clause 8. The system of any of Clauses 1-7, wherein the one or more components comprise a plurality of components in a row, wherein the state determination control unit generates a first end line at a first end of the row and a second end line at a second end of the row opposite from the first end line, wherein the state determination control unit further generates an upper boundary line associated with an upper edge of the row, and a lower boundary line associated with a lower edge of the row, wherein the first end line and the upper boundary line intersect at a first corner, wherein the first end line and the lower boundary line intersect at a second corner, wherein the second end line and the upper boundary line intersect at a third corner, wherein the second end line and the lower boundary line intersect at a fourth corner, and wherein the first corner, the second corner, the third corner, and the fourth corner are corners of a quadrilateral that bounds the plurality of components.

Clause 9. The system of any of Clauses 1-8, wherein the state determination control unit geometrically transforms the quadrilateral into a rectangle having respective corresponding corners to form a perspective corrected image.

Clause 10. The system of any of Clauses 1-9, wherein the state determination control unit extrapolates a shape of each of the one or more components within the image data.

Clause 11. The system of any of Clauses 1-10, wherein the state determination control unit determines the state of the one or more components through clustering.

Clause 12. The system of any of Clauses 1-11, wherein the state determination control unit determines the state of the one or more components by determining a difference in image attributes.

Clause 13. The system of any of Clauses 1-12, further comprising a user device, wherein the state determination control unit outputs a state signal indicative of the state of the one or more components to the user device.

Clause 14. The system of any of Clauses 1-13, wherein the state determination control unit outputs a component control signal that automatically operates the one or more components based on state of the one or more components.

Clause 15. A method comprising:
obtaining, by an imaging device, an image of one or more components within an internal cabin of a vehicle; and
receiving, by a state determination control unit comprising a processor that is in communication with the imaging device, image data including the image from the imaging device; and
determining, by the state determination control unit, a state of the one or more components based on the image data.

Clause 16. The method of Clause 15, wherein the state comprises one or both of an open state or a closed state.

Clause 17. The method of Clauses 15 or 16, wherein the one or more components are one or more overhead stowage bin assemblies.

Clause 18. The method of any of Clauses 15-17, wherein said determining comprises determining a region of interest within the image data.

Clause 19. The method of any of Clauses 15-18, wherein said determining further comprises determining the region of interest by determining a vanishing point within the image.

Clause 20. The method of any of Clauses 15-19, wherein said determining further comprises determining a bisecting line that passes through the vanishing point, and determining the region of interest by the bisecting line.

Clause 21. The method of any of Clauses 15-20, further comprising correcting for perspective, by the state determination control unit, within the image data.

Clause 22. The method of any of Clauses 15-21, wherein the one or more components comprise a plurality of components in a row, and wherein said determining comprises:
generating a first end line at a first end of the row and a second end line at a second end of the row opposite from the first end line;
generating an upper boundary line associated with an upper edge of the row, and a lower boundary line associated with a lower edge of the row, wherein the first end line and the upper boundary line intersect at a first corner, wherein the first end line and the lower boundary line intersect at a second corner, wherein the second end line and the upper boundary line intersect at a third corner, wherein the second end line and the lower boundary line intersect at a fourth corner, and wherein the first corner, the second corner, the third corner, and the fourth corner are corners of a quadrilateral that bounds the plurality of components.

Clause 23. The method of any of Clauses 15-22, wherein said determining further comprises geometrically transforming the quadrilateral into a rectangle having respective corresponding corners to form a perspective corrected image.

Clause 24. The method of any of Clauses 15-23, wherein said determining further comprises extrapolating a shape of each of the one or more components within the image data.

Clause 25. The method of any of Clauses 15-24, wherein said determining comprises determining the state of the one or more components through clustering.

Clause 26. The method of any of Clauses 15-25, wherein said determining comprises determining a difference in image attributes.

Clause 27. The method of any of Clauses 15-26, further comprising outputting, by the state determination control unit, a state signal indicative of the state of the one or more components to a user device.

Clause 28. The method of any of Clauses 15-27, further comprising outputting, by the state determination control unit, a component control signal that automatically operates the one or more components based on state of the one or more components.

Clause 29. A non-transitory computer-readable storage medium comprising executable instructions that, in response to execution, cause a system comprising a processor, to perform operations comprising:
receiving image data including an image of one or more components within an internal cabin of a vehicle from an imaging device within the internal cabin; and
determining a state of the one or more components based on the image data.

Clause 30. The non-transitory computer-readable storage medium of Clause 29, wherein said determining comprises determining a region of interest within the image data.

Clause 31. The non-transitory computer-readable storage medium of Clauses 29 or 30, further comprising correcting for perspective within the image data.

Clause 32. The non-transitory computer-readable storage medium of any of Clauses 29-31, wherein said determining further comprises extrapolating a shape of each of the one or more components within the image data.

Clause 33. The non-transitory computer-readable storage medium of any of Clauses 29-32, wherein said determining further comprises determining the state of the one or more components through clustering.

While various spatial and directional terms, such as top, bottom, lower, mid, lateral, horizontal, vertical, front and the like can be used to describe embodiments of the subject disclosure, it is understood that such terms are merely used with respect to the orientations shown in the drawings. The orientations can be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described embodiments (and/or aspects thereof) can be used in combination with each other. In addition, many modifications can be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are exemplary embodiments. Many other embodiments will be apparent to those of skill in the art upon reviewing the above description. The scope of the various embodiments of the disclosure should, therefore, be determined with reference to the appended claims, along with the full scope of equivalents to which such claims are entitled. In the appended claims and the detailed description herein, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and can include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A system comprising:
   components within an internal cabin of a vehicle, wherein the components are in a row;
   an imaging device configured to obtain an image of the components in the row; and
   a state determination control unit comprising a processor, wherein the state determination control unit is in communication with the imaging device,
   wherein the state determination control unit is configured to receive image data including the image of the components from the imaging device, and
   wherein the state determination control unit is configured to determine a state of the components based on the image data including the image of the components in the row, wherein the state determination control unit is further configured to:
      generate, within the image, a first end line at a first end of the row and a second end line at a second end of the row opposite from the first end line, and
      generate, within the image, an upper boundary line associated with an upper edge of the row, and a lower boundary line associated with a lower edge of the row, wherein the first end line and the upper boundary line intersect at a first corner, wherein the first end line and the lower boundary line intersect at a second corner, wherein the second end line and the upper boundary line intersect at a third corner, wherein the second end line and the lower boundary line intersect at a fourth corner, and wherein the first corner, the second corner, the third corner, and the fourth corner are corners of a quadrilateral that bounds the components.

2. The system of claim 1, wherein the state comprises one or both of an open state or a closed state.

3. The system of claim 1, wherein the components are overhead stowage bin assemblies.

4. The system of claim 1, wherein the state determination control unit is further configured to determine a region of interest within the image data.

5. The system of claim 4, wherein the state determination control unit is further configured to determine the region of interest by determining a vanishing point within the image.

6. The system of claim 5, wherein the state determination control unit is further configured to determine a bisecting line that passes through the vanishing point, wherein the region of interest is determined by the bisecting line.

7. The system of claim 1, wherein the state determination control unit is further configured to correct for perspective within the image data.

8. The system of claim 1, wherein the state determination control unit is further configured to geometrically transform the quadrilateral into a rectangle having respective corresponding corners to form a perspective corrected image.

9. The system of claim 1, wherein the state determination control unit is further configured extrapolate a shape of each of the components within the image data.

10. The system of claim 1, wherein the state determination control unit is configured to determine the state of the components through clustering.

11. The system of claim 1, wherein the state determination control unit is configured to determine the state of the components by determining a difference in image attributes.

12. The system of claim 1, further comprising a user device, wherein the state determination control unit is further configured to output a state signal indicative of the state of the components to the user device.

13. The system of claim 1, wherein the state determination control unit is configured to output a component control signal that automatically operates the components based on state of the components.

14. A method comprising:
   obtaining, by an imaging device, an image of components in a row within a vehicle;
   receiving, by a state determination control unit comprising a processor that is in communication with the imaging device, image data including the image of the components in the row from the imaging device; and
   determining, by the state determination control unit, a state of the components based on the image data including the image of the components in the row, wherein said determining comprises generating, within the image, a first end line at a first end of the row and a second end line at a second end of the row opposite from the first end line, and generating, within the image, an upper boundary line associated with an upper edge of the row, and a lower boundary line associated with a lower edge of the row, wherein the first end line and the upper boundary line intersect at a first corner, wherein the first end line and the lower boundary line intersect at a second corner, wherein the second end line and the upper boundary line intersect at a third corner, wherein the second end line and the lower boundary line intersect at a fourth corner, and wherein the first corner, the second corner, the third corner, and the fourth corner are corners of a quadrilateral that bounds the plurality of components, and wherein the state comprises one or both of an open state or a closed state, and wherein the one or more components are one or more overhead stowage bin assemblies.

15. The method of claim 14, wherein said determining further comprises:
determining a region of interest within the image data;
determining the region of interest by determining a vanishing point within the image; and
determining a bisecting line that passes through the vanishing point, and determining the region of interest by the bisecting line.

16. The method of claim 14, further comprising correcting for perspective, by the state determination control unit, within the image data.

17. The method of claim 14, wherein said determining further comprises
geometrically transforming the quadrilateral into a rectangle having respective corresponding corners to form a perspective corrected image.

18. The method of claim 14, wherein said determining further comprises:
extrapolating a shape of each of the components within the image data;
determining the state of the components through clustering; and
determining a difference in image attributes.

19. The method of claim 14, further comprising:
outputting, by the state determination control unit, a state signal indicative of the state of the components to a user device; and outputting, by the state determination control unit, a component control signal that automatically operates the components based on the state of the components.

20. A non-transitory computer-readable storage medium comprising executable instructions that, in response to execution, cause a system comprising a processor, to perform operations comprising:

receiving image data comprising an image of components within a row within an internal cabin of a vehicle from an imaging device within the internal cabin;

determining a state of the one or more components based on the image data including the image of the components in the row, wherein said determining comprises generating, within the image, a first end line at a first end of the row and a second end line at a second end of the row opposite from the first end line, and generating, within the image, an upper boundary line associated with an upper edge of the row, and a lower boundary line associated with a lower edge of the row, wherein the first end line and the upper boundary line intersect at a first corner, wherein the first end line and the lower boundary line intersect at a second corner, wherein the second end line and the upper boundary line intersect at a third corner, wherein the second end line and the lower boundary line intersect at a fourth corner, and wherein the first corner, the second corner, the third corner, and the fourth corner are corners of a quadrilateral that bounds the plurality of components; and outputting a component control signal that automatically operates the components based on the state of the components.

21. The non-transitory computer-readable storage medium of claim 19, further comprising geometrically transforming the quadrilateral into a rectangle having respective corresponding corners to form a perspective corrected image.

* * * * *